United States Patent [19]

Tisell et al.

[11] Patent Number: 5,606,891
[45] Date of Patent: Mar. 4, 1997

[54] SLIDABLE AND TILTABLE STEERING COLUMN SUPPORT

[75] Inventors: Claes G. E. Y. Tisell, Strángnás; Kurt Strómberg, Torshälla, both of Sweden

[73] Assignee: Fuji Autotech Aktiebolag, Sweden

[21] Appl. No.: 400,575

[22] Filed: Mar. 8, 1995

[30] Foreign Application Priority Data

Mar. 9, 1994 [SE] Sweden ................... 9400799

[51] Int. Cl.$^6$ ................................................. B62D 1/18
[52] U.S. Cl. .............................. 74/493; 74/531; 280/775
[58] Field of Search ...................... 74/493, 531; 280/775

[56] References Cited

U.S. PATENT DOCUMENTS

| | | | |
|---|---|---|---|
| 4,476,741 | 10/1984 | Yamaguchi | 74/493 |
| 5,131,287 | 7/1992 | Stromberg | 74/493 |
| 5,259,264 | 11/1993 | Bodin et al. | 74/493 |
| 5,301,567 | 4/1994 | Snell et al. | 74/493 |
| 5,361,646 | 11/1994 | Venable | 74/531 |

FOREIGN PATENT DOCUMENTS

| | | | |
|---|---|---|---|
| 3920783 | 8/1990 | Germany | 280/775 |
| 292779 | 4/1990 | Japan | 280/775 |

*Primary Examiner*—Charles A. Marmor
*Assistant Examiner*—Troy Grabow
*Attorney, Agent, or Firm*—Larson and Taylor

[57] ABSTRACT

A steering column support includes a solid holder or box arranged for stationary mounting in a vehicle. The steering column support also includes a steering column which is longitudinally displacable (slidable) and/or rotatable (tiltable) in relation to the stationary box and means for providing a locking and releasing, respectively, of the steering column slide in relation to the stationary box under cooperation of locking lamella packs. The column slide is box shaped and is formed so solid and rigid that there cannot appear any substantial resilient movement or deformation thereof during locking and releasing, respectively, of the steering column. The steering column slide is slightly narrower than the distance between the sides of the stationary box, one side of the steering column slide is arranged to be pressed directly against the stationary box, whereas the opposite side thereof exposes a slight gap against the box and is locked at this side by means a window lamella which is displacable in the transverse direction in the steering column slide.

6 Claims, 3 Drawing Sheets

SLIDABLE AND TILTABLE STEERING COLUMN SUPPORT

FIELD OF THE INVENTION

The present invention generally relates to a steering column support of the type which is adapted for stationary mounting in a vehicle and by means of which the steering column with the steering wheel can be both reciprocated or slid in the axial direction of the steering column, and concurrently therewith, or alternatively therewith, can be rotated or tilted in a vertical plane thereby changing the angular position of the steering column.

BACKGROUND OF THE INVENTION

The invention is a development of the known steering column support which is shown for instance in applicant's own U.S. Pat. No. 5,131,287, and which comprises a solid holder or box which is arranged for being mounted in the vehicle and which carries a support or a slide for the steering column which support is slidable in the longitudinal direction and is tiltable, and in which the steering column slide is formed with support arms which can be resiliently compressed and locked against the sides of the solid holder or box, so that the steering column slide and the box provide a solidly interconnected unit, and so that the steering column slide with the steering column and the steering wheel can not intentionally be slid or tilted, not even in case of a heavy actuation of the steering wheel. The apparatus makes it possible to release the parts from each other and to provide a quick, light and safe individual setting of the steering wheel for each individual driver or for each special driving situation.

In the known apparatus the steering column slide, and in particular the support arms thereof, is made of such relatively thin material that said support arms can be resiliently compressed against the stationary mounted box and can be released from the sides of the box, respectively, in connection to a longitudinal sliding or tilting movement of the box. In said embodiment of the steering column support the mounting of the steering wheel, by some drivers and in some situations, may be apprehended as slightly unstable or resilient, and this may cause a certain unacceptable feeling of driving unsafely. The relatively thin material of the steering column slide also may cause some wear of the mounting parts between the slide and solid box, which wear may lead to a slight play, which play is multiplied as far as to the steering wheel which is located relatively far from the steering column support and in which steering wheel said play is considered inconvenient.

SUMMARY OF THE INVENTION

The present invention is intended to solve the problems and the disadvantages of the known steering column support and to provide a steering column support of the above mentioned type comprising a solid box adapted for stationary mounting in a vehicle, a steering column holder or slide which is slidable in the longitudinal direction and which is tiltable in relation to said solid box, and means for providing a locking and a releasing, respectively, of the steering column slide in relation to the solid box, and in which the steering column slide is formed so strong and rigid that no resilient movement can be felt in the steering wheel and no play can appear due to wear.

The locking means comprises locking pistons which are pressed against a series of cooperating lamellas and intermediate locking washers. A locking shaft extends through slots of the lamellas in the steering column slide and the box sides.

A problem in this connection is that the steering column slide must be made slightly narrower than the mounting groove of the solid box in order not to obstruct a free sliding and tilting of the slide when the steering wheel position is being changed. If the steering column slide is made very rigid it is difficult to press and slide resiliently against the sides of the stationary box.

In order to prevent and play between the cooperating parts and provide a rigid inter-locking of the parts, one of the slots in the side of the steering column slide, through which the inter-engaging locking shaft extends, is formed wider than the diameter of the locking shaft, and the outermost locking lamella, on this side of the steering column slide, is formed as a "window lamella" having such shape and dimension that it is kept relatively play-free in its slot of the steering column slide, and so that said window lamella can be freely displaced laterally in the corresponding slot of the steering columns slide. For making such lateral displacement possible also said outermost locking lamella is thicker than the material of the side of the slide. In the locking position said outermost locking lamella is arranged to be pressed against the side of the box.

On one of the sides the steering column slide consequently will be pressed strongly against the side of the stationary box and will, without play, make a longitudinal sliding and a tilting possible of the steering column slide, and on the opposite side the lamella pack will, with the outmost "window lamella thereof, be pressed against the corresponding side of the box, whereas the steering column slide is formed with a slight free play against the box side. On this side a friction locking, preventing a longitudinal sliding and a tilting of the steering column slide, is obtained under cooperation with, and by means of, the "window lamella", not by means of the steering column slide.

If such a through extending locking lamella should be provided on both sides of the steering column slide, on which the steering column slide could move slightly transversally, there is a risk that the driver of the vehicle might, adversely, conceive the small plays, which must necessarily exist between the "window lamellas" and the slide slots, as a play in the steering column locking apparatus.

Further characteristics and advantages of the invention will be evident from the following detailed specification in which reference will be made to the accompanying drawings.

Figure 7:
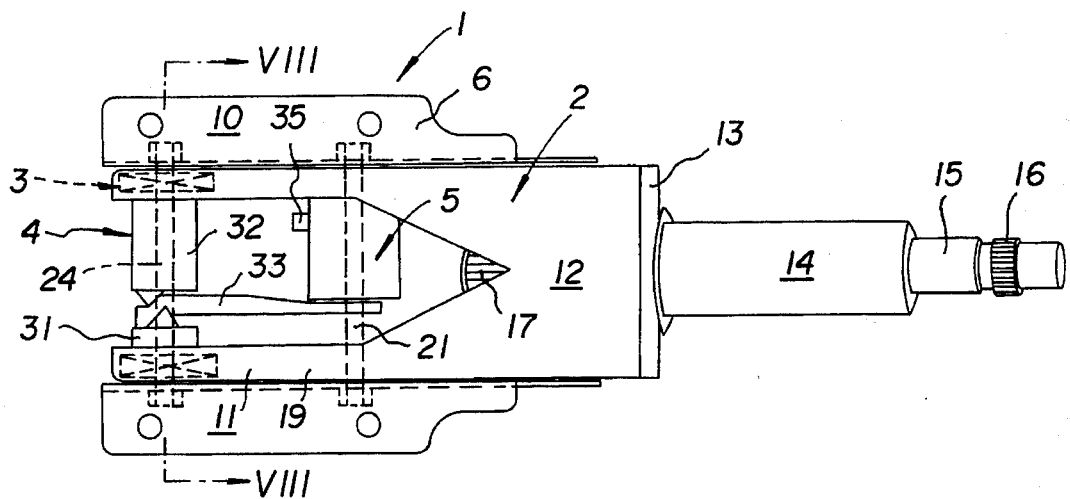
FIG. 7 is a top view of the steering column support axccording to the invention.
Figure 9:
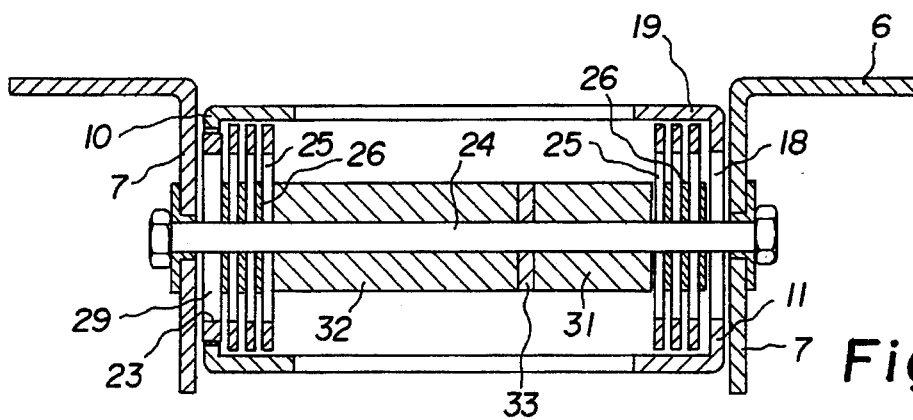

VIII of FIG. 7 showing the steering column support in locked condition, and FIG. 9 correspondingly shows the steering column support with released steering column slide.

DETAILED DESCRIPTION OF THE PREFERRED EMBODIMENTS

The steering column support shown in the drawings generally comprises a solid holder or box 1 intended to be stationary and rigidly mounted in a vehicle, a steering column slide 2 which is reciprocatable (slidable) and tiltable in said box 1, a lamella pack 3 on each side of the steering column slide adapted to lock the steering column slide 2 against the stationary box 1, a locking means 4 adapted to act on the lamella packs 3 and which locking means 4, in turn, is acted on by a power means 5 which is mounted in the steering column slide.

Figure 4:
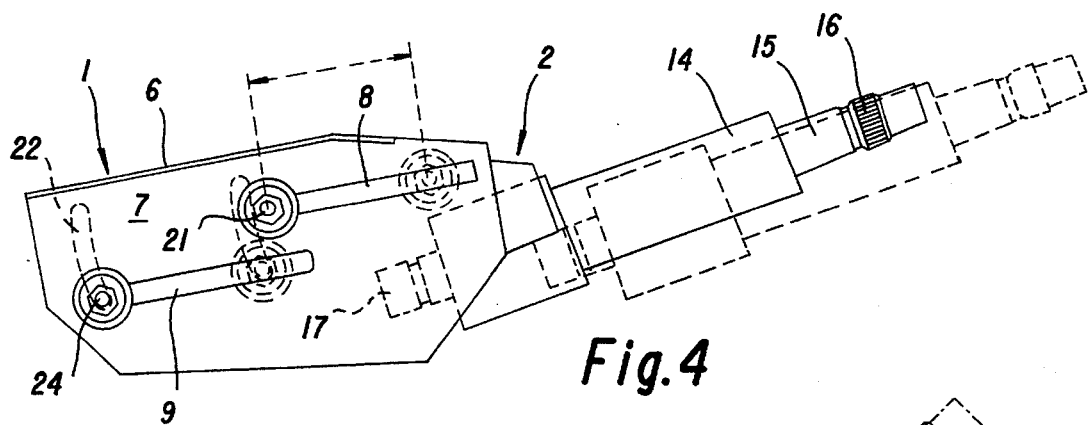
FIG. 4 is a side view of the steering column support which illustrates the axial displacement or sliding of the steering column, and FIG. 5 correspondingly illustrates a combination of an axial sliding and a tilting of the steering column.
Figure 5:
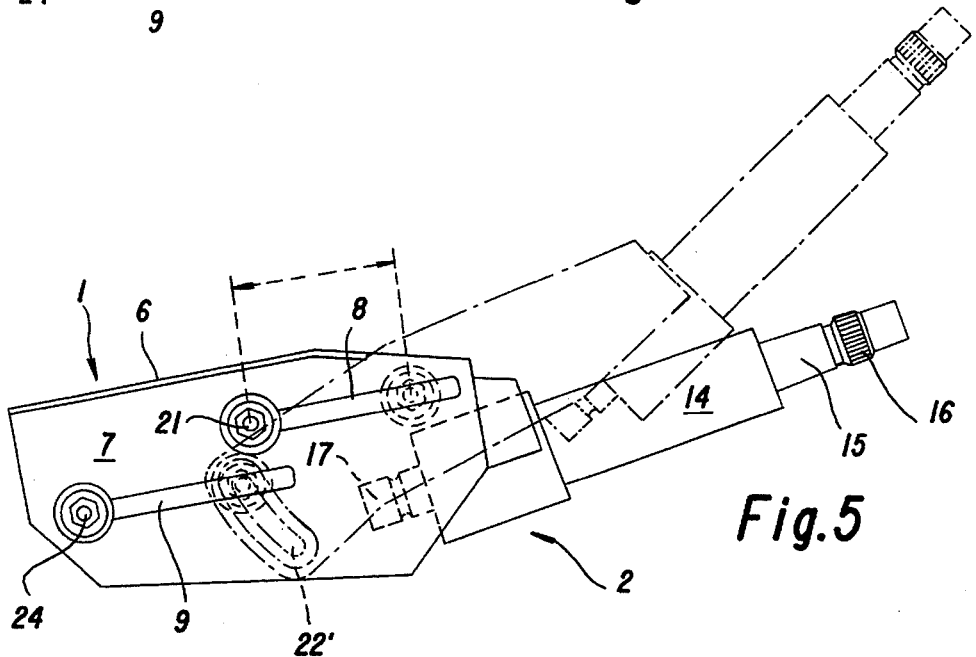
Figure 6:
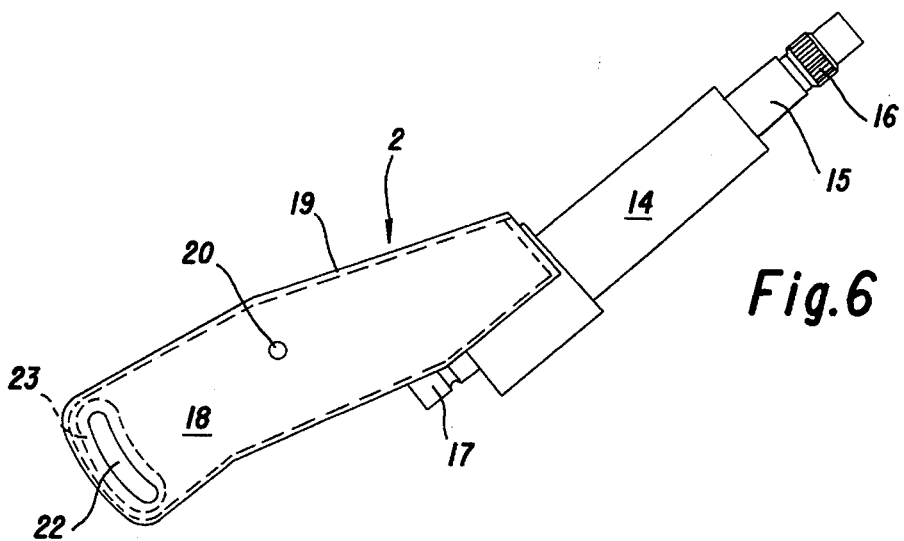
FIG. 6 is a side view of the steering column slide.

The stationary mounted holder or box 1 can be formed as an inverted U-shaped (∩) bracket, but in the drawings it is shown as two separate L-shaped angle plates having a foot part 6 which is arranged for being screwed, bolted or otherwise mounted underneath a supporting part of a vehicle, and a box side 7 which acts as a carrier means for the active parts of the steering column support. To this end each side 7 of the box is formed with two longitudinally extending slots 8, 9 which are best shown in FIGS. 4 and 5, and which slots, in the illustrated case, are shown provided on slightly different heights of the box side 7, and which slightly overlap each other.

In the illustrated embodiment the steering column slide 2 is formed as a solid unit comprising two parallel arms 10 and 11, a partly overbridging and stabilizing roof 12 and an interconnecting web part 13. A steering column tube 14 is mounted in said web part 13, and through said tube 14 a steering column 15 extends, which column can carry a steering wheel (not shown) on splines 16. The opposite end of the steering column 15 is formed with splines 17 for connecting thereof to a universal joint arranged for transmitting the steering wheel movements to the vehicle wheels, and the centre of rotation of which preferably is arranged in close proximity of the centre of tilting for the steering column slide.

Figure 1:
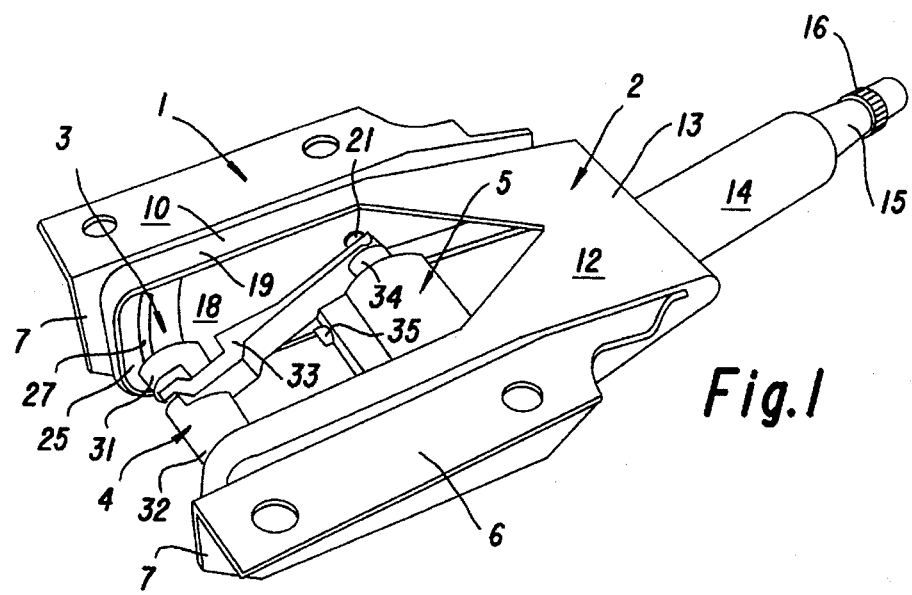
FIG. 1 shows a perspective view of a steering column support according to the invention, FIG. 2 correspondingly shows the steering column slide of the support of FIG. 1.
Figure 2:
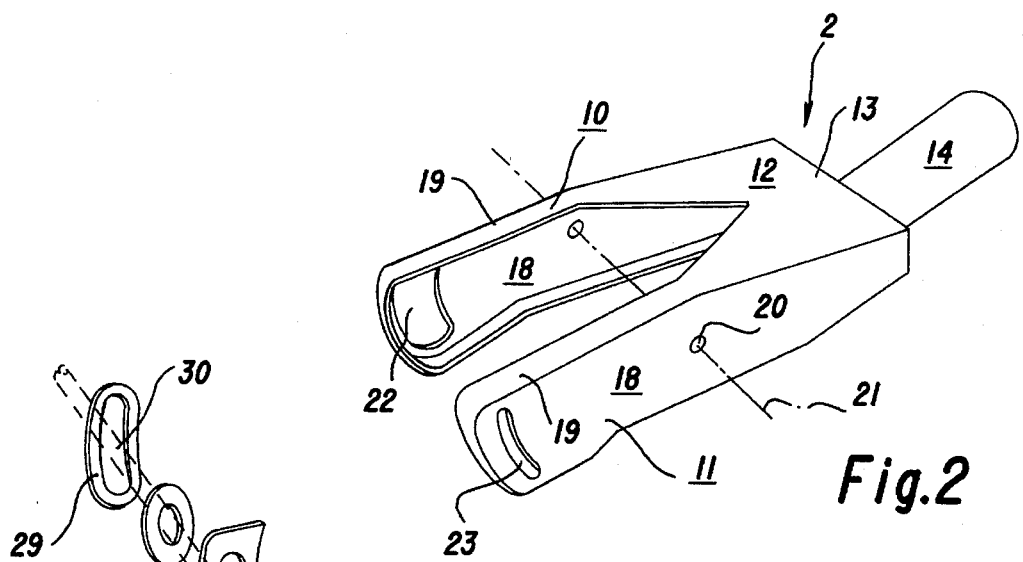

As best evident from FIG. 2 the steering column slide 2 is formed as a type of solid box, in which the box arms 10 and 11 are formed as even and parallel sides surfaces 18 and flanges 19 extending round the upper edge, the bottom edge and the short end of the side surface 18, and which flanges both stiffen the sides and form a carrier for the lamella packs 3. The even and parallel arms 10 and 11 have an overall outer width which is slightly less than the inner width between the sides 7 of the box 1. The reason therefore is that is must be possible to freely slide and tilt the solid steering column slide 2 between the box sides 7 thereby setting and readjusting of the steering wheel position. At a place substantially halfway the ends of the slide sides 18 there are bores 20 by means of which the slide 2 is tiltably mounted in the box 1 over a cross shaft 21 extending through the slots 8 of the box sides 7 and which shaft is slidable along said slots 8. Adjacent their outer ends the slide arms 10 and 11 are formed with curved slots 22 and 23, respectively, the curvature centre of which coincides with the centre of the cross shaft 21. The slot of one of the sides 11 has a width which is the same as that of a shaft 24 extending through the slots 9 of the box sides 7, through the slots 22 and 23 of the slide 2 and through the lamella pack 3 on each side of the slide. The slot 22 of the rear arm 10 (as shown in FIG. 2) is substantially wider than that of the slot 23, thereby adapting said slot 22 to a "window lamella" as will be explained more closely in the following.

Figure 3:
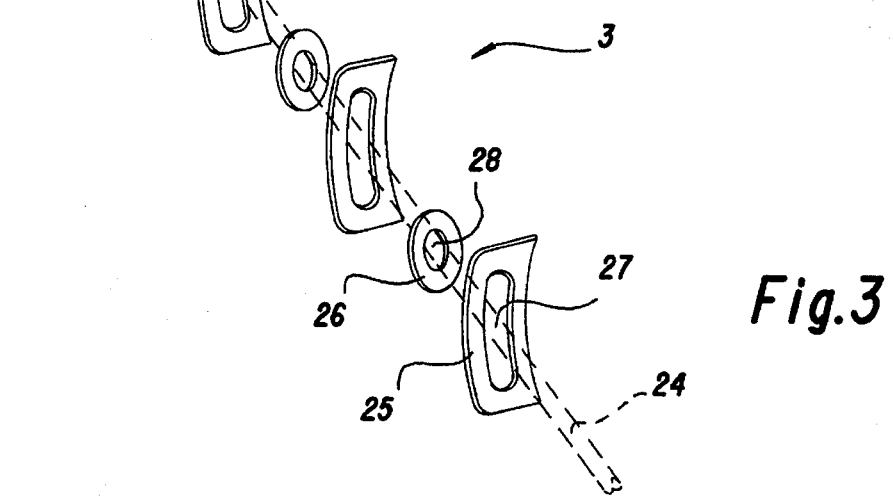
FIG. 3 shows an exploded perspective view of a locking lamella pack useful for the far back side of the steering column slide, as seen in the drawings.

Each lamella pack 3 comprises several, in the illustrated case three, curved lamellas 25, which as to shape and size almost exactly fits in between the flanges 19 at the end of each slide arm 10 and 11, respectively. Between each pair of curved lamellas 25 there is a lamella washer 26. The curved lamellas 25 are formed with curved slots 27, see FIG. 3, of the same shape, size and location as those of the slot 23 of the slide arm 11. The washers 26 are formed with bores 28 the diameter of which is the same as the diameter of the locking shaft 24.

On one side of the steering column support, the side facing the viewer as shown in FIG. 2, the lamella pack comprises only curved lamellas 25 and intermediate lamella washers 26.

On the opposite side the lamella pack is, at the far back end thereof, formed with a so called "window lamella" 29 having a curved slot 30 of the same shape, size and location as the slots 22 and 27. The window lamella 29 provides a corresponding, substantially play-free fit in the window lamella slot 22 of the slide arm 10 but it is of a slightly thicker material than the material of the arm surface 18, so that the lamella pack on the side of the slide can be compressed against the corresponding box side 7 without having the side 18 of the slide 2 becoming pressed against the side 7 of the box 1.

For compressing the lamellas of the packs 3 there is a locking means of a type which is known per se and which comprises two locking pistons 31 and 32 which are slidable on the shaft 24, and engaging between said locking pistons a locking arm 33 acting as a two-armed lever and which normally keeps the locking pistons 31 and 32 pressed apart thereby compressing the lamella packs 3 with a predetermined force. For the actuation of the locking arm 33 there is a power means 5 having a telescopable slide 34 which is actuated by an inner spring which normally keeps the locking pistons apart, and having a hydraulic, pneumatic or other connection 35 for providing a retraction of the slide 34 thereby unloading the corresponding end of the locking arm 33, whereby the locking pistons 31, 32 are released from power and the lamellas of the lamella packs are released from each other.

In such released condition the steering wheel can be adjusted by two different sets of two cooperating movements, namely an axial displacement (sliding movement) as indicated with the dotted lines of FIG. 4, whereby the shafts 21 and 24 are moved parallel to each other in the box slots 8 and 9, or a rotation of the steering column slide 2 about the axis of rotation 21 (tilting movement), as indicated with the point-dotted lines of FIG. 5, or by a combined axial sliding movement and a tilting about the axis of rotation 21, as indicated with the dotted and point-dotted lines respectively of FIG. 5, whereby the shafts 21 and 24 are moved in the slots 8 and 9 at the same time as the steering column slide 2 is rotated about its tilting bores 20 and with the locking shaft 24 extending in the curved slots 22, 27 and 30. FIG. 5 indicates, with the point-dotted lines, the angle over which the steering column can be rotated (tilted) in a vertical plane. During such tilting the shaft 24 and the lamella washers 26 are still standing, whereas the curved lamellas 25 and 29, locked inside the flanges 19 of the slide arms 10 and 11 follow the tilting movement of the slide 2.

Figure 8:
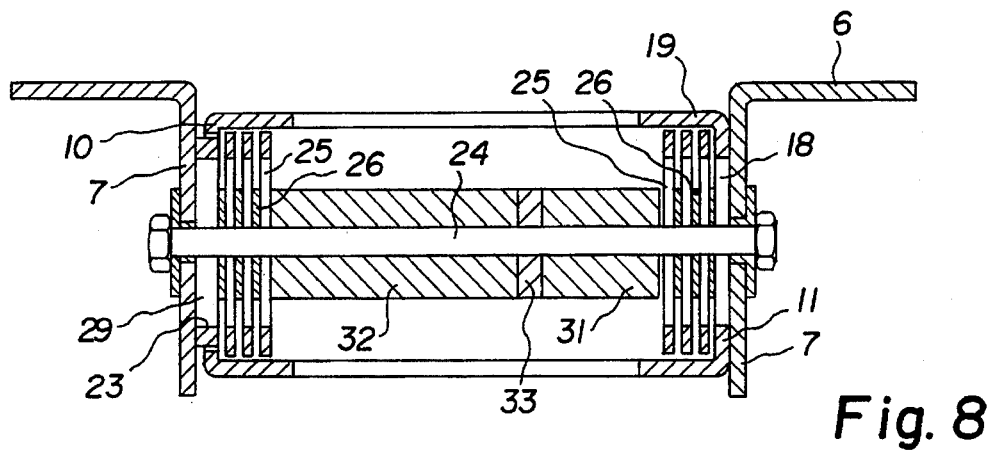
FIG. 8 is a cross section view along line VIII—

FIG. 8 shows a cross section through a steering column support according to the invention in locked condition. It is evident that the pistons 31 and 32 are pressed apart by the locking arm 33, and that the piston 31, at right in the figure, compresses the pack of lamellas 25 including the intermediate lamella washers 26, which lamella pack directly contacts the side 18 of the slide, whereby the side 18 of the slide arm 11 is abutted and strongly pressed against the right box side 7, whereas piston 32, at left in the figure, compresses the lamellas 25 and the intermediate lamella washers 26 and the "window lamella" 29 extending through the window slot 23 against the left slide side 10. A very narrow gap is allowed between the side 18 of the slide arm 10 and the corresponding side 7 of the box.

In FIG. 9 is illustrated how the locking arm 33 is released by the power means 5. Such unloading is made by a hydraulic, pneumatic or other actuation of the power means 5, oppositely to the action of the spring included in the power pack, which normally keeps the lamella packs in their locking positions. Upon said unloading of the locking arm 33 the locking lamellas and the lamella washers on both sides are released from each other, and the "window lamella" 29 can slide slightly transversally in the window slot 23 of the slide arm 10 so as to be free from the left box side 7. Likewise the slide side 18 can move slightly transversally from the right box side 7.

It is obvious that the steering column slide 2 in this position is free to slide in relation to the stationary holder 1 within the limits which are defined by the length of the slots 8 and 9 of the box, and that the slide is free to tilt within the limits which are defined by the length of the lamella slots 22, 27 and 30 of the slide and the lamellas respectively.

Reference numerals

| | | | |
|---|---|---|---|
| 1 | holder, box | 21 | tilt shaft |
| 2 | steering column slide | 22 | slot (of 11) |
| 3 | lamella pack | 23 | slot (of 10) |
| 4 | locking means | 24 | locking shaft |
| 5 | power means | 25 | curved lamella |
| 6 | foot part | 26 | lamella washer |
| 7 | box side | 27 | slots (of 25) |
| 8 | slot | 28 | bore (of 26) |
| 9 | slot | 29 | "window lamella" |
| 10 | slide arm (of 2) | 30 | slot (of 29) |
| 11 | slide arm (of 2) | 31 | locking piston |
| 12 | roof part (of 2) | 32 | locking piston |
| 13 | web part (of 2) | 33 | locking arm |
| 14 | steering column tube | 34 | slide (of 5) |
| 15 | steering column | 35 | connection means |
| 16 | splines (of 15) | | |
| 17 | splines (of 15 | | |
| 18 | side surface (of 10, 11) | | |
| 19 | flange | | |
| 20 | bore (of 18) | | |

We claim:

1. A steering column support comprising:
   a solid holder arranged for stationary mounting in a vehicle, said holder having a cross shaft and a locking shaft extending between opposite sides thereof;
   a box-shaped steering column slide having a width narrower than a distance between said sides of said holder such that said steering column slide is insertable between said sides of said holder, said steering column slide including cross slots in opposite sides thereof, and being longitudinally displacable relative to said holder and rotatable about said cross shaft;
   a window lamella comprising a thicker material than a material forming said sides of said steering column slide, one of said cross slots having a size and shape for receiving said window lamella such that said window lamella is transversely displacable in said cross slot; and
   locking and releasing means positioned on said locking shaft for moving said window lamella into and out of contact with the adjacent side of said solid holder to respectively lock and release movement of said steering column slide relative to said holder.

2. The steering column support according to claim 1 wherein said locking and releasing means comprises locking pistons and a series of cooperating lamellas and washers positioned therebetween, said cooperating lamellas and washers being positioned between said locking pistons and each of said sides of said holder whereby said cooperating lamellas are pressed toward and away from said sides of said steering column slide by said pistons to respectively lock and release movement of said steering column slide relative to said holder.

3. The steering column support according to claim 2 wherein said locking and releasing means further includes a locking arm comprising a two-armed lever for pressing the locking pistons apart and against said cooperating lamellas by a predetermined force when said locking arm is in a non-actuated condition and for allowing movement of said locking pistons toward each other to release said cooperating lamellas when said locking arm is actuated to allow longitudinal displacement and rotation of said steering column slide relative to said holder.

4. The steering column support according to claim 2 wherein upper and lower ends of said sides of said steering column slide include inwardly facing flanges, said corresponding lamellas having an outer shape and size corresponding to a space between flanges on each of said sides of said steering column slide, said corresponding lamellas including a slot having a shape and size corresponding to a shape and size of respective cross slots.

5. The steering column support according to claim 1 wherein said holder includes first and second longitudinally extending slots on each of said sides of said holder, said cross shaft extending through recesses in sides of said steering column slide and through both of said first longitudinally extending slots, said locking shaft extending through said cross slots and both of said second longitudinally extending slots, whereby said steering column slide is longitudinally displacable relative to said holder by movement of said cross and locking shafts in said longitudinally extending slots.

6. The steering column support according to claim 5 wherein said recesses comprise bores having substantially same dimensions as said cross shaft, said recesses being positioned near an end of said steering column slide closest to a steering wheel of a vehicle, and said cross slots comprise curved slots having centers of curvature coinciding with a center of said cross shaft, whereby said steering column slide is tiltable relative to said holder by rotation of said steering column slide about said cross shaft and movement of said locking shaft in said cross slots.

* * * * *